United States Patent
Khazane et al.

(10) Patent No.: US 12,518,196 B2
(45) Date of Patent: *Jan. 6, 2026

(54) TECHNIQUES FOR BIMODAL LEARNING IN A FINANCIAL CONTEXT

(71) Applicant: Capital One Services, LLC, McLean, VA (US)

(72) Inventors: Anish Khazane, San Francisco, CA (US); Alan Salimov, San Bruno, CA (US); Omar Florez Choque, Oakland, CA (US)

(73) Assignee: Capital One Services, LLC., McLean, VA (US)

(*) Notice: Subject to any disclaimer, the term of this patent is extended or adjusted under 35 U.S.C. 154(b) by 1076 days.

This patent is subject to a terminal disclaimer.

(21) Appl. No.: 16/999,615

(22) Filed: Aug. 21, 2020

(65) Prior Publication Data

US 2020/0380419 A1 Dec. 3, 2020

Related U.S. Application Data

(63) Continuation of application No. 16/268,480, filed on Feb. 5, 2019, now Pat. No. 10,776,720.

(51) Int. Cl.
*G06N 20/00* (2019.01)
*G06Q 40/02* (2023.01)

(52) U.S. Cl.
CPC ............. *G06N 20/00* (2019.01); *G06Q 40/02* (2013.01)

(58) Field of Classification Search
CPC ................................. G06N 20/00; G06Q 40/02
See application file for complete search history.

(56) References Cited

U.S. PATENT DOCUMENTS

| | | | |
|---|---|---|---|
| 8,386,297 B2 * | 2/2013 | Heyns | G06Q 10/06393 |
| | | | 705/7.38 |
| 10,963,965 B1 * | 3/2021 | Hughes | G06F 3/04883 |

(Continued)

OTHER PUBLICATIONS

Chen et al. (Neural Model-Based Reinforcement Learning for Recommendation, Dec. 2018, pp. 1-18) (Year: 2018).*

(Continued)

*Primary Examiner* — George Giroux
(74) *Attorney, Agent, or Firm* — KDW FIRM PLLC

(57) ABSTRACT

Techniques for bi-modal learning in a financial context are described. These techniques are configured to improve a user's financial acumen and bring the user into an optimal financial state. Some of these techniques are embodied in a device that operates financial education lessons specifically configured for the improving the user's current financial state. These techniques may implement rewards/penalties (in tokens) for correct/incorrect user responses to financial decisions being presented in these lessons for user to make. By exploiting the user's desire for rewards and tokens and the desire to improve the user's current financial state, these techniques may leverage machine learning techniques to identify an appropriate financial education lesson that is most likely to have a positive effect on the user. Over time, administrating the financial education lessons builds customer loyalty to the device that implements these techniques. Other embodiments are described and claimed.

20 Claims, 10 Drawing Sheets

Apparatus 200

(56) References Cited

U.S. PATENT DOCUMENTS

| | | | |
|---|---|---|---|
| 2011/0159467 A1* | 6/2011 | Peot | G09B 7/06 |
| | | | 434/157 |
| 2016/0275636 A1* | 9/2016 | Olenick | G06F 3/04842 |
| 2018/0032841 A1* | 2/2018 | Kluckner | G16H 40/63 |
| 2018/0286272 A1* | 10/2018 | Mcdermott | A63F 13/69 |
| 2018/0336636 A1* | 11/2018 | Jibowu | G06Q 40/06 |
| 2019/0130789 A1* | 5/2019 | Mishael | G06Q 20/108 |

OTHER PUBLICATIONS

Marinescu et al. (Prediction-Based Multi-Agent Reinforcement Learning in Inherently Non-Stationary Environments, May 2017, pp. 1-23) (Year: 2017).*

* cited by examiner

User Interface 500

| Debt-to-Token Ratio 520 | Program 510 |
|---|---|
| 300:100 | Select one of the following options:<br><br>A) Buy Toy Race Car for 100 tokens<br><br>B) Do Not Buy Car<br><br>C) Fixed Term Loan at 10% for 24 months (4.61 tokens/month)<br><br>D) Loan for 100 Tokens at 1% per month<br><br>E) Pay 50 Tokens and Take a Loan for 50 Tokens at 10% for 1 year |
| Token Account 530 | |
| 100 | |

```
PROCESS A PROGRAM MODEL CORRESPONDING TO A
PLURALITY OF PROGRAMS
602

IDENTIFY, FROM THE PROGRAM MODEL, A PROGRAM TO
RUN BASED UPON A BEHAVIOR MODEL
604

RUN THE PROGRAM AND PROCESS USER RESPONSE DATA
606

MODIFY THE BEHAVIOR MODEL AND UPDATE THE
CURRENT FINANCIAL STATE
608

COMPARE THE UPDATED FINANCIAL STATE WITH AN
OPTIMAL FINANCIAL STATE TO PRODUCE A COMPARISON
RESULT
610

MODIFY A POLICY MODEL BASED UPON THE COMPARISON
RESULT
612
```

```
┌─────────────────────────────────────────┐
│  SELECT A PROGRAM CONFIGURED TO INCREASE A │
│       CURRENT DEBT-TO-TOKEN RATIO        │
│                  702                     │
└─────────────────────────────────────────┘
                    │
┌─────────────────────────────────────────┐
│  COMPUTE AN EXPECTED REWARD/PENALTY AND AN │
│  EXPECTED DEBT-TO-TOKEN RATIO BASED UPON PAST │
│                 DECISIONS                │
│                   704                    │
└─────────────────────────────────────────┘
                    │
┌─────────────────────────────────────────┐
│  PROCESS A USER RESPONSE COMPRISING AN ANSWER TO A │
│     FINANCIAL DECISION IN THE PROGRAM    │
│                   706                    │
└─────────────────────────────────────────┘
                    │
┌─────────────────────────────────────────┐
│  COMPARE AN OPTIMAL DEBT-TO-TOKEN RATIO WITH THE │
│  EXPECTED DEBT-TO-TOKEN RATIO AND THE ACTUAL DEBT- │
│              TO-TOKEN RATIO              │
│                   708                    │
└─────────────────────────────────────────┘
```

*FIG. 7*

TECHNIQUES FOR BIMODAL LEARNING IN A FINANCIAL CONTEXT

RELATED APPLICATIONS

This application is a continuation of U.S. patent application Ser. No. 16/268,480, filed Feb. 5, 2019, titled "TECHNIQUES FOR BIMODAL LEARNING IN A FINANCIAL CONTEXT". The contents of the aforementioned application are incorporated herein by reference in their entirety.

BACKGROUND

Money (or capital) forms a foundation for almost every human endeavor. For this reason, some people strive to have a better understanding of the institutions and processes that are built on money or capital. Most people have a limited experience when it comes to managing and/or producing capital and often, rely on professionals to handle such matters. Being well-versed in matters of finance and banking, these professionals are given authority over clients' funds to manage and, hopefully, grow into profits. These professions, imbued with considerable public trust, can violate that public trust with ease. When a person's trust is violated, it is difficult or even impossible to regain that trust. In view of the above, having a pedestrian understanding turns out to be a detriment to the user—one that may be easily exploited.

It is with respect to these and other considerations that the present improvements have been needed.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

Various embodiments are generally directed to techniques for bi-modal learning in a financial context. Some embodiments are particularly directed to techniques to provide bi-modal learning in a financial context for an overall goal of brand recognition and retaining customer loyalty. An apparatus, a method, and a computer readable medium may be configured with these embodiments.

In one embodiment, for example, an apparatus may include logic stored in computer memory and executed on the processing circuit. The logic may be operative to cause the processing circuit to: process a policy model corresponding to a plurality of programs of which each program corresponds to a reward or a penalty to a current financial state, the policy model to configure the plurality of programs to improve upon the current financial state. The logic may be operative to identify, from the policy model, a program to run based upon a behavior model. The behavior model may correspond to past decisions with respect to at least one of the plurality of programs; run the program and process user response data. The logic may be operative to modify the behavior model and update the current financial state based upon the user response data. The logic may be operative to compare the updated financial state with an optimal financial state from an optimizer model to produce a comparison result. The logic may be operative to modify the policy model based upon the comparison result. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

FIG. 5 illustrates an embodiment of a learning process using the system of FIG. 1.

FIG. 6 illustrates an embodiment of a logic flow for the system of FIG. 1.

FIG. 7 illustrates an embodiment of a second logic flow for the system of FIG. 1.

DETAILED DESCRIPTION

Figure 1:
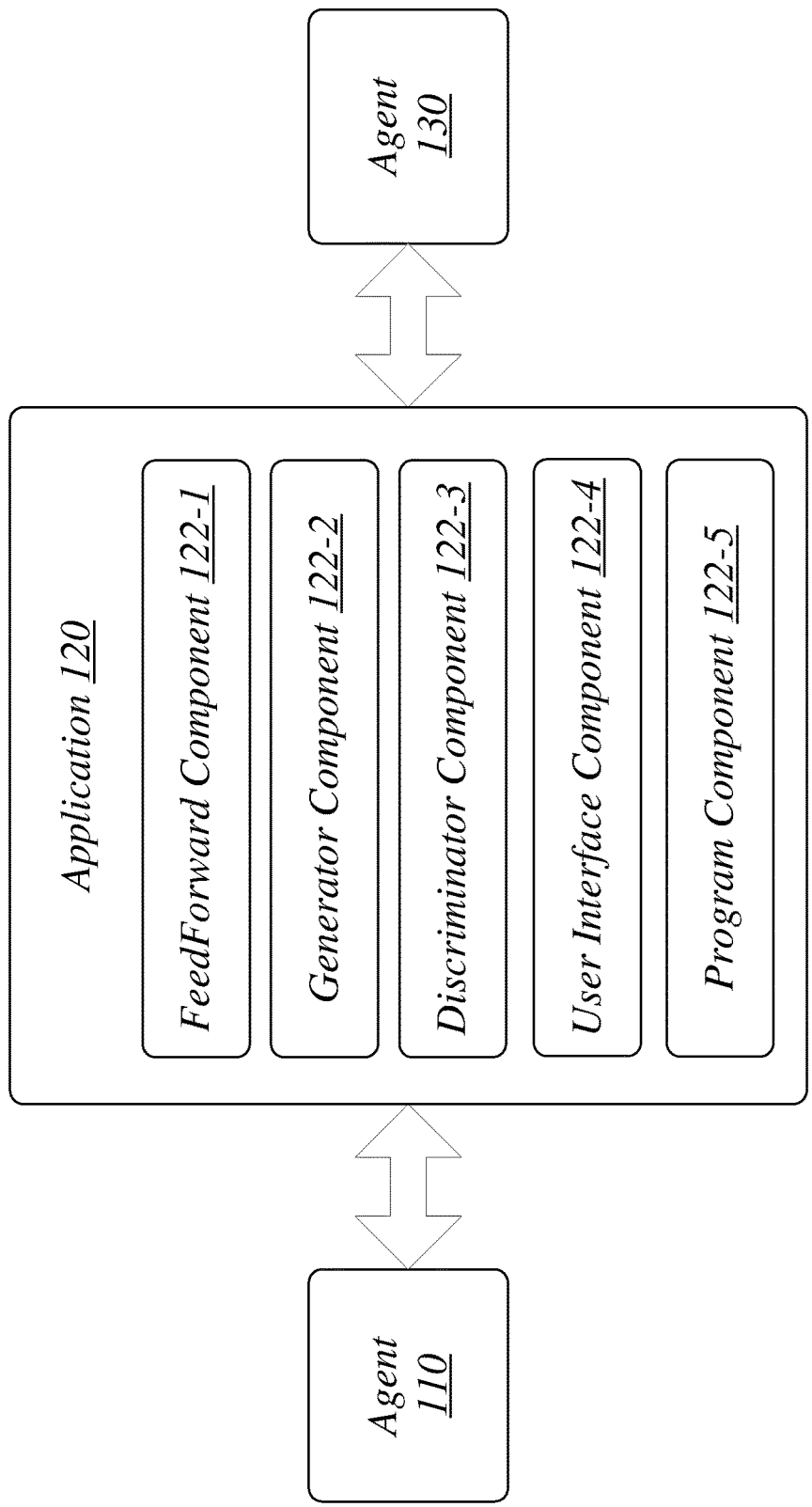
FIG. 1 illustrates an embodiment of a system for bi-modal learning in a financial context.

Various embodiments are directed to enabling bi-modal learning in a financial context. The various embodiments included herein describe bi-modal learning as a machine learning concept that exploits, for a specific purpose or goal, one agent's desire for tokens and another agent's desire to give tokens in a zero-sum game. Some embodiments establish the goal as facilitating competent financial comprehension for the user. The bi-modal learning techniques described herein may involve a generative adversarial network (GAN), which is a deep neural network architecture, or a similar structure consisting of neural networks pitted against one another. The Generative adversarial network (GAN) may include a generator component and a discriminator component that operate with each other in a loop until an end goal is achieved.

While conventional Generative Adversarial Networks have two neural networks pitted against each other, the present disclosure describes, as one example embodiment, a modified implementation of the Generative Adversarial Network (GAN) that includes, as another component, a neural network that predicts a likely response based upon past behavior. This component, referred to as a feedforward component, provides, as one advantage, a non-Markov property for the GAN. In some embodiments, the feedforward component of the GAN computes a likely number of tokens that a user will legitimately earn at a particular round or point-in-time (time t) in a learning process. The likely number of tokens represents an expected or predicted number of tokens based upon a probability of achieving an optimal number of tokens given the user's past behavior. The user may respond to a program running a financial education lesson with information (e.g., answers to the program's questions/decisions) in an attempt to gain at least some tokens. The program evaluates the information and upon determining a worth of that information submission, either provides one or more tokens in satisfaction of such a submission, penalizes the submission by removing one or more tokens, or sets a value of zero tokens. Other implementations may skip the running of the program and use the likely number of tokens instead of an actual number of tokens earned.

The discriminator component of the GAN compares the likely number of tokens/the actual number of tokens to the optimal number of tokens and produces a comparison result indicating a difference between the likely number of tokens/the actual number of tokens and the optimal number of tokens. The generator component processes the above difference, as input, and modifies the program and/or other programs in an attempt to increase the likely number of tokens/the actual number of tokens being provided to the user at a subsequent round or point-in-time (t).

Various embodiments proceed to run another program teaching another financial lesson and evaluate any user response data to the other financial lesson. Over time, the user's responses exhibit more hallmarks of competent financial comprehension and move toward having an optimal debt-to-token ratio. In this manner, the example techniques more effectively and efficiently instill financial literacy tailored by the particular user's interactions. The various embodiments may run financial lessons when the user is a child and accordingly, the user may depend upon the various embodiments to advance their financial understanding and live in the real world. This dependence builds customer loyalty by that child for the brand as a source for the various embodiments described herein. As a result, the embodiments can improve affordability, scalability, modularity, extendibility, or interoperability for an operator, device or network.

With general reference to notations and nomenclature used herein, the detailed descriptions which follow may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modifications, equivalents, and alternatives consistent with the claimed subject matter.

FIG. 1 illustrates a block diagram for a system 100. In one embodiment, the system 100 may include a computer-implemented system having an application 120 including one or more components 122-$a$ where $a$ represents any positive integer. Although the system 100 shown in FIG. 1 has a limited number of elements in a certain topology, it may be appreciated that the system 100 may include more or less elements in alternate topologies as desired for a given implementation.

The application 120 may be a software application generally arranged to encourage financial competency through administration of finance education lessons. The application 120 may administer these lessons in a modular approach by way of individual programs. When executed, these programs are operative to generate content for presentation to a user (e.g., a child) via audio/visual equipment and other equipment. Each financial education lesson generally refers to a series of financial decisions for the user to make. To illustrate by way of example, a financial education lesson may be designed to inform the user on successful saving techniques, handling commercial and personal loans, managing securities, and other proper financial behavior. At a certain point-in-time within the financial education lesson, the application 120 may prompt the user with a financial decision involving a multiple choice of options, resulting in either a reward or penalty. If the user desires a toy race car, the financial education lesson may present various selectable options of achieving that goal. If the financial education lesson relates to a loan for purchasing the toy race car or to loans in general, the financial decision may require the user to make a choice concerning loan terms, such as an interest rate. Each choice results in a change to the user's current financial state (e.g., a debt-to-token ratio) and based upon a comparison between the user's current financial state and an optimal financial state, the application 120 selects another financial education lesson to present to the user.

The application 120 may include a feedforward component 122-1, a generator component 122-2, and a discriminator component 122-3 and these components form at least a portion of a deep neural net architecture, such as a Generative Adversarial Network (GAN). The generator component 122-2 and the discriminator component 122-3 may be configured to perform unsupervised machine learning on certain datasets to train a classifier and determine one or more truths. The generator component 122-2 generates new data instances as input for the discriminator component 122-3, which evaluates these instances by determining whether each data instance belongs to the training/optimal datasets. The discriminator component 122-3 classifies a data instance given the features of the data instance and predicts a label or category to which that data instance belongs. The discriminator component 122-3 may express such a correlation mathematically where the label is called y and the features are called x such that $p(y|x)$ is used to mean "the probability of y given x"; for example, $p(y|x)$ could translate into the probability or likelihood that an email is spam given the words it contains.

In contrast, instead of predicting a label given certain features, the generator component 122-2 predicts features given a certain label or classification. The generator component 122-2 may express this prediction as $p(x|y)$, the probability of x given y, or the probability of features given a label or classification; for example, $p(x|y)$ could translate into the probability or likelihood of having these words in an email given that the email is labelled SPAM. The probabilities $p(x|y)$ and $p(y|x)$ form part of a probability distribution and, as training progresses, are adjusted to better reflect the actual distribution of SPAM and increase an accuracy of future SPAM predictions.

In a financial context, features may describe any applicable data point (e.g., data points regarding financial education lessons or the user) and the probability p(x|y) could translate into a probability that a financial education lesson results in an expected reward or penalty or the probability of the features describing the financial education lesson given the expected reward or penalty; whereas, the probability p(y|x) translates into a probability of the expected reward or penalty given the financial education lesson. The generator component 122-2 and the discriminator component 122-3 cooperate to form a probability distribution and the feedforward component 122-1 enhances the cooperation by predicting a set of lessons given the user's past financial activities with money and past financial decision in terms of rewards and penalties.

In one embodiment, the feedforward component 122-1 identifies the set of lessons given a label classification of the user's financial activities and past financial decisions. This label classification may refer to a determined level or a degree of the user's financial acumen based on the user's interactions. Based upon the user's label classification, the feedforward component 122-1 identifies a set of candidate financial education lessons for potential presentation to the user. One example implementation of the feedforward component 122-1 proceeds to narrow down the set to a particular financial education lesson to teach the user by comparing an expected reward or expected penalty for each lesson in the set and selecting the lesson with a highest expected reward (or a lowest expected penalty). The lesson having the highest expected reward is configured to improve the user's current financial state, for example, by decreasing a debt-to-token ratio. One example implementation of the feedforward component 122-1 computes an expected reward from a probability of completing the financial education lesson and a reward associated with completing the financial education lesson. This reward may result from the user entering a correct answer or answers to a financial decision or decisions. The probability of completing the financial education lesson may be computed based on the user's past experience with a same or similar financial education lesson.

The user interface component 122-4 selects, from the program component 122-5, a corresponding program for the selected financial education lesson. Upon the selection, the user interface component 122-4 runs the corresponding program, which involves may involve generating GUI elements on a display device of the agent 110. In some embodiments where the agent 110 may include an interactive system or machine having robotic capabilities (e.g., an intelligent robot), the user interface component 122-4 may engage various mechanical components of the agent 110 (e.g., robotic arms) in presenting the financial education lesson. Via the user interface component 122-4, the application 120 receives response data from the agent 130 (e.g., a child) having an answer or answers to one or more financial decisions in the financial education lesson. It is appreciated that the response data may be any input from the agent 130 in any form including gestures, speech, data entry via an input device, and/or the like. Based upon the response data, the discriminator component 122-3 determines an appropriate actual reward or penalty. The response data is used by the generator component 122-2 to update the label classification of the user's financial activities and past financial decisions (including any financial decision from the financial education lesson).

The generator component 122-2 proceeds to determine a current financial policy toward future or pending financial decisions. By financial policy, the present disclosure is describing feature information comprising a set of attributes that correspond to the user's goals and desires. Therefore, the probability p(x|y) in the financial context may be a probability of satisfying each financial decision in completion of a financial education lesson given a weighted analysis of the set of attributes in the current financial policy and a set of attributes corresponding to past financial decisions. Determining the satisfaction of each financial decision may involve a weighted analysis of attributes corresponding to the financial education lesson. One example attribute may define a difficulty of the financial education lesson. The probability p(x|y) may be based upon a conditional probability distribution but may also be a computed value from a function f. As an example, the function f may be a type of heuristic function performing a weighted analysis of a set of attributes of the financial education lesson. The generator component 122-2 may compare the weighted analysis of the financial education lesson with the weighted analysis of the set of attributes in the current financial policy and the set of attributes corresponding to the past financial decisions and, based upon this comparison, determines whether the agent 130 (e.g., a child) is likely to satisfy each financial decision in the financial education lesson.

As described herein, the GAN generally exploits the zero-sum game at work between two agents—the agent 110 and the agent 130 being modeled for the application 120 as the generator component 122-2 and the discriminator component 122-3, respectively. Various embodiments of the present disclosure implement the GAN to teach or train one or both agents 110, 130 towards some goal(s). In a financial context, the present disclosure introduces a GAN operating between the user and the application 120, which may be run on any type of device including mechanical devices, where the user's goals may be codified in a policy and the application 120's goals may be optimal financial behavior by the user. The user may be a child of a certain age of comprehension, and the example techniques are tailored to systematically and automatically improve the child's financial intelligence over time based on that child's interactions and experiences. The present disclosure envisions a considerable number of embodiments of the application 120, including the application 120 embedded in a machine having robotic capabilities (e.g., robotic arms).

The feedforward component 122-1 provides another neural network model to the GAN: A behavior model incorporating the past decisions by the user with respect to above-mentioned financial education lessons (i.e., programs). If a same or similar program is repeated by the application, the feedforward component 122-1 accesses the behavior model and identifies a previous user response to that same or similar program. In some embodiments, the previous user response is predicted to be repeated. In other embodiments, the user changes their response such that the previous user response is no longer valid.

In general, the user interface component 122-4 generates user interface data for output from the application 120, via an output device, and display by a display device (e.g., a monitor). The user interface data may be configured to present a Graphical User Interface (GUI) elements on the output device in addition to text and static images. Some of the GUI elements may be intended for interaction with the user, such that the user may enter commands and/or text through one or more GUI elements.

The program component 122-5 stores program information corresponding to financial education lessons. As described herein, each financial education lesson may include one or more individual financial decisions; these financial decisions are data points for the learning process of the GAN. Attributes of these financial decisions include a difficulty attribute, a reward attribute, and a penalty attribute and are stored in the behavior model for the feedforward component 122-1.

Figure 2:
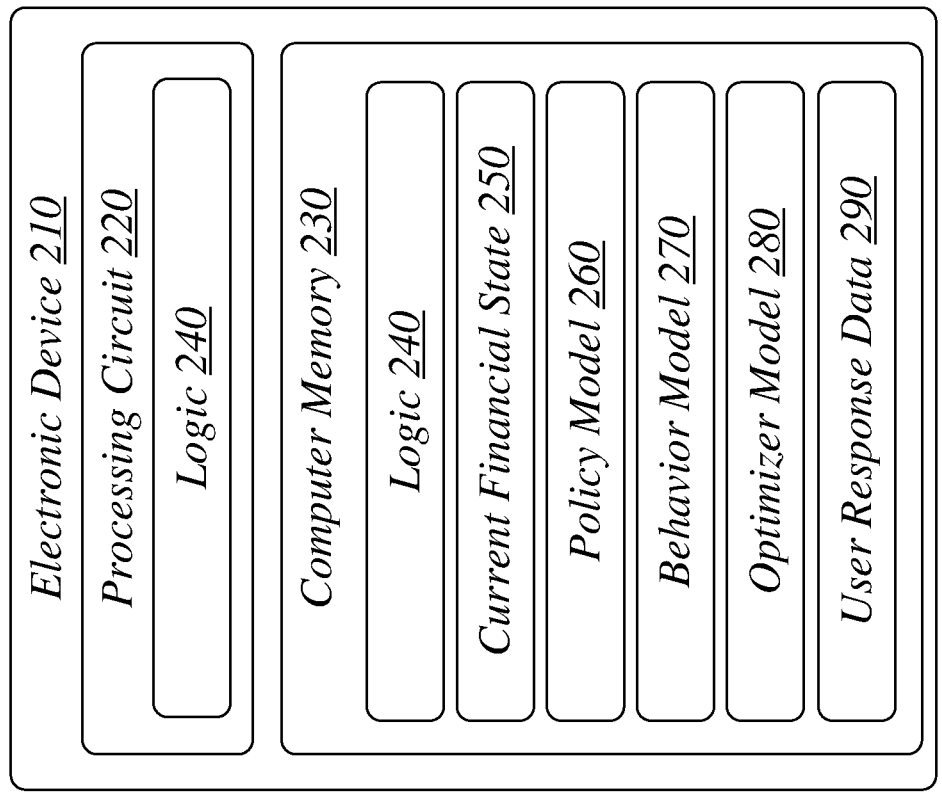
FIG. 2 illustrates an embodiment of an apparatus for the system of FIG. 1.

FIG. 2 illustrates an embodiment of an apparatus 200 for the system 100. As shown in FIG. 2, the apparatus 200 may implement some or all of the structure and/or operations for the system 100 in a single computing entity, such as entirely within a single electronic device 210. The electronic device 210 may include various computer hardware and software, including a processing circuit 220 and computer memory 230 on which logic 240 may be executed and stored, respectively. As an example, the logic 240 may include computer code or instructions configured to function as the application 120 of FIG. 1. The computer memory 230 and the processing circuit 220 may store and execute other data besides the logic 240.

The logic 240 is stored in the computer memory 230 and executed by the processing circuit 220 in order to effectuate bi-modal learning in a financial context and, as a result, increase a user's current financial state 250. The logic 240 may be operative to process a policy model 260 corresponding to a plurality of programs of which each program provides a reward or a penalty to the current financial state 250. The present disclosure is to fully describe the policy model 260 that is to configure the plurality of programs to improve upon the current financial state.

The logic 240 may be further operative to identify, from the policy model 260, a program to run based upon a behavior model 270 corresponding to past decisions by the user with respect to at least one of the plurality of programs. The identified program should at least be configured to improve upon the current financial state 250 (e.g., decrease the user's debt-to-token ratio). In one embodiment, the logic 240 may identify the program having a highest expected reward amongst the plurality of programs; while, in an alternative embodiment, the logic 240 may identify the program having a reward attribute that is to bring the user's current financial state 250 closest to an optimal financial state for the user's age group.

An optimizer model 280 (e.g., a neural network as described herein) follows a statistical analysis of optimal financial health and assigns weights to financial health attributes, including debt, income, and credit availability attributes. The optimizer model 280—similar to the behavior model 270 and the policy model 260—applies the statistical analysis such that a certain data item (i.e., an attribute) is emphasized more than other data items. This may be accomplished by assigning a number variable known as a weight to each data item that reflects its relative importance based on the objective of the optimizer model 280—which is to efficiently and effectively improve the user's financial acumen.

The logic 240 may be further operative to run the program and process user response data 290 indicating a debt or a credit of tokens from the current financial state 250. The logic 240 may be further configured to modify the behavior model 270 and update the current financial state 250 based upon the user response data 290. The logic 240 may be further configured to compare the updated financial state 250 with an optimal financial state, as provided by the optimizer model 280, to produce a comparison result and modify the policy model 260 based upon the comparison result. The logic 240 may update the behavior model with program information and the resulting penalty or reward from the user response data 290.

In some embodiments, the policy model 260 is initialized with feature information including attributes associated with the user's financial goals and financial activities. Before selecting the financial education lesson and a paired program to run, the logic 240 may perform a weighted analysis of the attributes to compute an expected reward or an expected penalty for a financial decision in each candidate program's lesson. Concluding such an analysis, the logic 240 identifies the candidate program having a highest expected reward amongst the candidate programs.

The feature information generally refers to any data for predicting user response to a financial decision in a financial education lesson. There are attributes in the feature information for recreation, for example, video gaming, personal fitness, sports, outdoor activities, among others. The policy model 260 assigns weights to those attributes distinguishing the user from other users. For example, the particular user may love video gaming and assign a higher weight to that attribute than another user who does not love video gaming. As demonstrated herein, when the policy model 260 is incorporated into bi-modal learning, the weight for video gaming plays a role in identifying a financial education lesson and a program to run.

The logic 240 initializes the policy model 260 with program information (e.g., the program component 122-5 of FIG. 1). The program information can be defined as attributes defining each program, including an appropriate age or age group, a difficulty level, and a reward and/or a penalty. One example implementation of the logic 240 further initializes the policy model 260 with one or more programs appropriate for an age group of the user. As the user grows older, the logic 240 is to modify both the policy model 260 and the optimizer model. The present disclosure describes the policy model 260 and the optimizer model 280 as agents in the bi-modal learning of financial acumen and their operation together requires that both be modified as the user ages. The policy model 260 is updated with programs appropriate for a current age group of the user in response to a change in the user's age or age group. The logic 240 is further configured to modify the optimal financial state data of the optimizer model 280 in response to a change in user age.

The apparatus 200 of FIG. 2 may be embodied in a robot such that the logic 240 is embedded in a module of a circuit board that also includes the computer memory 230 and the processing circuit 220. In some embodiments, the robot itself may operate various features and components. As a reward for positive user response, the logic 240 may provide access to the various features and/or components in addition to or as an alternative to tokens. For instance, the logic 240 may unlock certain features and/or components in response to the correct user response. On the other hand, the logic 240 may lock certain features and/or components as a penalty for an incorrect user response. It is appreciated that the features and/or components may include any form of entertainment including downloadable content; the present disclosure cannot be construed to limit the robot's features and/or components with respect to scope.

Figure 3:
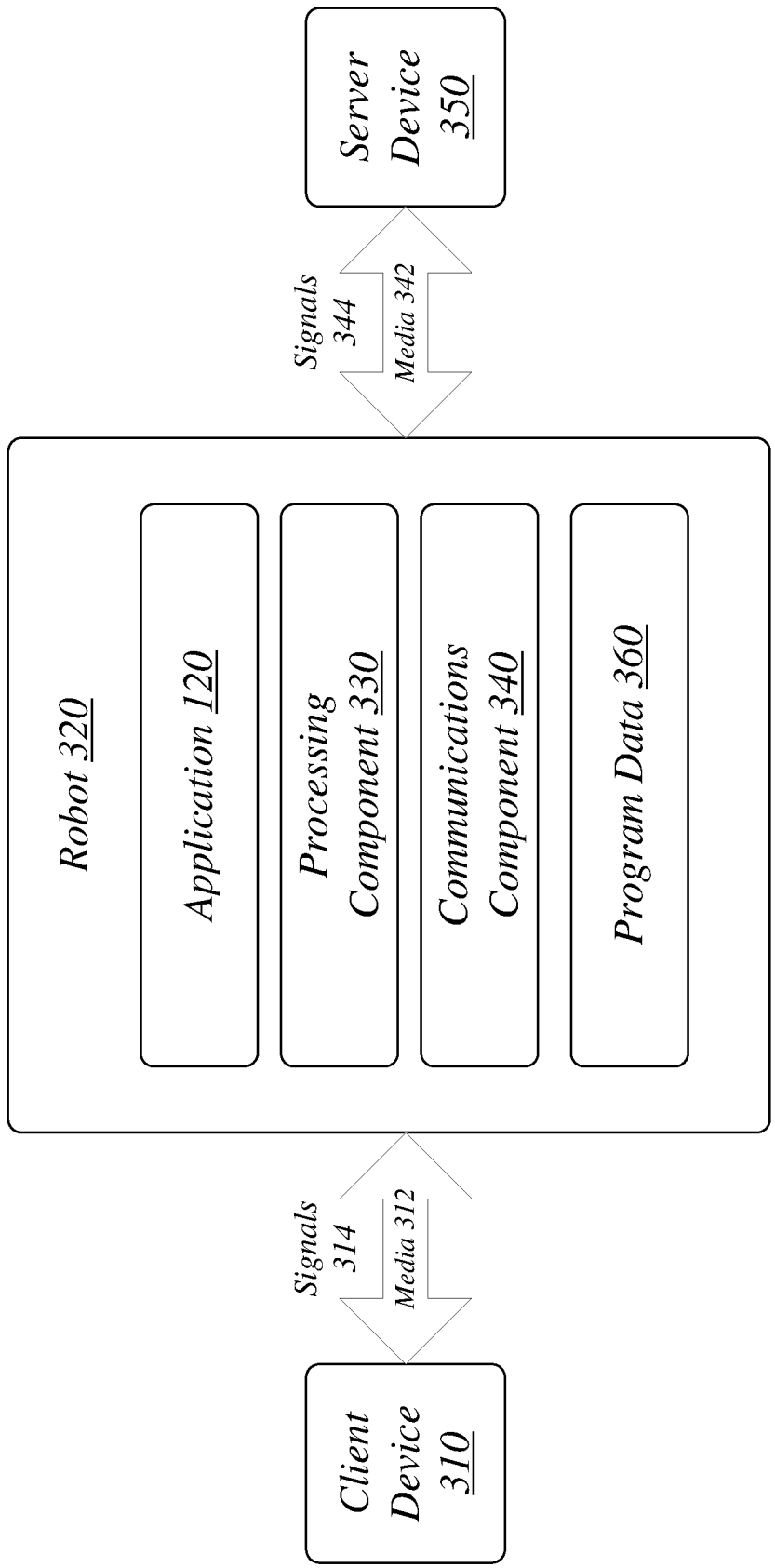
FIG. 3 illustrates an embodiment of a centralized system for the system of FIG. 1.

FIG. 3 illustrates a block diagram of a distributed system 300. The distributed system 300 may implement some of the structure and/or operations for the system 100 in an electronic device (e.g., the electronic device 210 of FIG. 2) while using other devices to implement other portions of the structure and/or operations for the system 100. It is appreciated that the electronic device may be included within a housing having a body with mechanical parts. At least some of the mechanical parts may be mechanical appendages (e.g., robotic arms). The electronic device may operate within this housing and the device's functionality may be expressed through the mechanical parts. One example embodiment of the electronic device may be housed within a robot 320 or a similar machine.

The robot 320 may include any electronic device capable of receiving, processing, and sending information for the system 100. Examples of an electronic device may include without limitation an ultra-mobile device, a mobile device, a personal digital assistant (PDA), a mobile computing device, a smart phone, a telephone, a digital telephone, a cellular telephone, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The robot 320 may execute processing operations or logic for the system 100 using a processing component 330. The processing component 330 may comprise various hardware elements, software elements, or a combination of both. Examples of hardware elements may include devices, logic devices, components, processors, microprocessors, circuits, processing circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), Application-specific Standard Products (ASSPs), System-on-a-chip systems (SOCs), Complex Programmable Logic Devices (CPLDs), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The robot 320 may execute communications operations or logic for the system 100 using communications component 340. The communications component 340 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 340 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 312, 342 include wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The robot 320 may communicate with other devices, such as a client device 310 and a server device 350, over the communications media 312, 342, respectively, using communications signals 314, 344, respectively, via the communications component 340. The devices 310, 350 may be external to the robot 320 as desired for a given implementation. The client device 310 generally refers to a user's personal device (e.g., a mobile device) and the server device 350 generally refers to a centralized system for managing and updating the application 120. For example, in response to development of new financial education lessons, the server device 350 may update the application 120 and transfer to the robot 320 program data 360 for running the new financial education lessons.

For any given financial education lesson, the robot 320 may run some of the program data 360 for that lesson on the client device 310. In general, the program data 360 includes graphical and/or textual content as well as computer code that when executed, presents the graphical and/or textual content and generated GUI elements for interacting with a child having the client device 310. The robot 320 may display some content on the client device 310's screen while the robot 320 performs or presents another aspect of the financial education lesson. This may include one or more financial decision for the user to make. The user may enter and the client device 310 may accept input comprising user response data for a certain financial decision, which in turn is processed by the robot 320. If the user response data is determined to include a correct user response, the application 120 running in the robot 320 grants a reward in the form of tokens and/or unlocked features/components of the robot 320. However, if the user response data is determined to include an incorrect user response, the application 120 running inside the robot 320 penalizes the user by removing tokens and/or locking features/components of the robot 320.

In one embodiment, the robot 320 (and/or the client device 310) interacts with the user via a natural user interface (NUI). Natural User Interfaces are user interfaces that implement one or more natural input modalities, such as touch, gestures or voice, to process user input (e.g., user commands).

Figure 4:
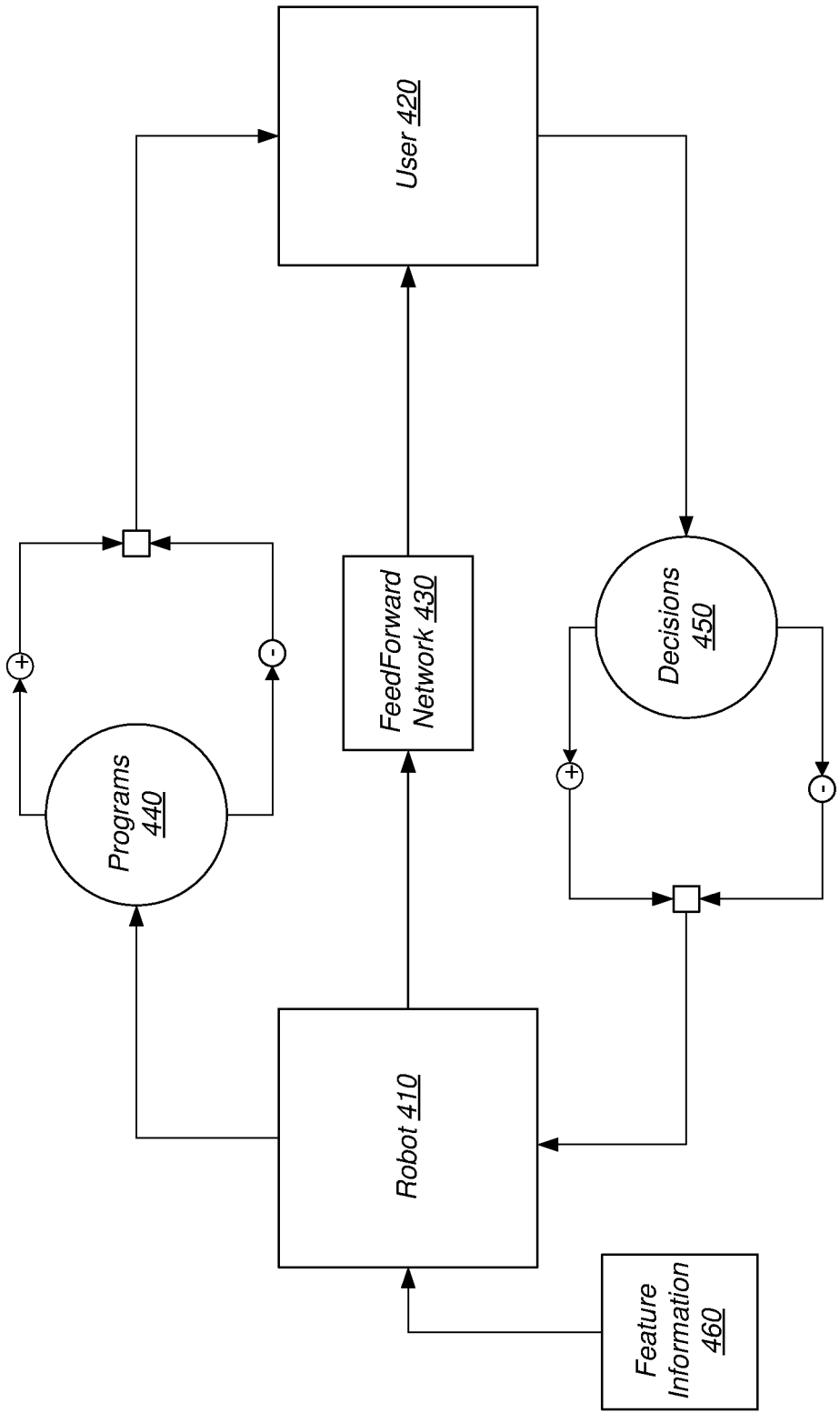
FIG. 4 illustrates an embodiment of a user interface for an application in the system of FIG. 1.

FIG. 4 illustrates a conceptual diagram of a learning process 400 using the system 100 of FIG. 1. As shown in FIG. 4, the learning process 400 is a bi-modal process involving two agents, a robot 410 and a user 420, which initially may be a child.

The robot 410 (e.g., the robot 320 of FIG. 3) may be any machine with robotic components, input/output components, and a housing, such as a robotic human figure with a body and appendages. The robot 410 may further include a natural user interface (NUI) for accepting various input modalities, such as speech, gesture, and touch. The robot 410 may further include a display device for displaying text and graphics associated with running a program for a financial education lesson. Some embodiments of the present disclosure include the apparatus 200 of FIG. 2 into the robot 410.

The robot 410 combines hardware and software to store and process a neural network configured to model the user 420's expected response to a financial decision according to some embodiments. The user 420's neural network generally models that user's behavior in terms of financial acumen at a current state (s) or timestep (t). For example, the user 420's neural network (e.g., the behavior model 270 of FIG. 2) may be configured to compute an expected reward or penalty for a given financial education lesson (l) based upon the user's financial acumen. A feedforward network 430 may be a neural network providing information to the user 420's neural network regarding that user 420's past decisions with respect to previously administered financial education lessons. As described herein, each program of programs 440 refers to a financial education lesson within which there are a number of financial decisions 450 to be made by the user 420. The robot 410 executes a program of the program 440 and presents a corresponding financial education lesson's content (e.g., audio/visual content) to the user 420.

At setup, the robot 410 processes feature information 460 comprising an initial set of attributes describing, for the user 420's neural network, the associated child's background, ambitions, desires, and/or the like. The robot 410 may use the feature information 460 to establish a policy for improving the user 420's current financial state. The policy may include a neural network (e.g., the policy model 260 of FIG. 2) that also is initialized with the attributes of the feature information to accept the current financial state as input and, to predict an appropriate (e.g., optimal) policy for configuring the financial education lessons in the programs 440. The policy's neural network may output an optimal financial education lesson or lessons to run in order to improve upon the current financial state. The robot 410 may modify the policy neural network's attributes, over time, as more interactions with the associated child occur.

In operation, based upon the above-mentioned policy and the user 420's current financial state (e.g., as defined by a debt-to-token ratio), the feedforward network 430 identifies a set of potential financial education lessons to run. Based upon each lesson and the associated user's previous behavior, the user 420's neural network determines an expected reward and expected financial state. The robot 410 may select for execution the financial education lesson having a highest expected reward and expected financial state. In one embodiment, the robot 410 engages in a modified Q-learning approach (as described herein) to select the appropriate financial education lesson to run.

The robot 410 runs a program of the programs 440 associated with the selected financial education lesson. The user 420 makes the financial decisions 450 of which each decision results in either a reward or a penalty of tokens and is returned to the robot 410. The decisions 450 are fed back into the robot 410 which updates the feedforward network 430 and the policy's neural network. In some instances, the decisions 450 differ from the user's expected response and over time, the robot 410 modifies the user 420's neural network. The above operation(s) execute continuously until the user 420's financial state substantially meets or exceeds an optimal financial state. In some embodiments, the optimal financial state may be an optimal debt-to-token ratio for the user 420's age or age group.

In some embodiments directed to adversarial bi-modal learning, the robot 410 may run the application 120 and thus, may model the user 420's decisions in one neural network and model optimal financial state data in another neural network. Together, the application 120 may model the relationship between the robot 410 and the user 420 as an adversarial non-Markovian model, such as a GAN without the Markov property, comprising a policy model, one neural network, and an optimizer model, the other neural network. In adversarial bi-modal learning, the optimizer model for the robot 410 is weighted to maximize a reward or goal of getting the associated child to make correct financial decisions and the policy model for the user 420 is weighted to maximize rewards in terms of tokens, unlocked components, new features, among other types of rewards. The unlocked components and/or new features may be related to the robot 410 itself, another device, or some digital content. The child's current financial state or debt-to-token ratio determines which rewards, components, and/or features are available to the associated child.

It is well-known that the Markov property refers to a memoryless property of a process such as the learning process 400; a model without the Markov property has a conditional probability distribution of future states of the process depends upon a present state and/or a past state. Hence, a sequence of the financial decisions 450 can be considered variables that are dependent upon previous decisions. When the robot 410 identifies the program from the programs 440 to run for the user 420, the robot 410 performs a weighted analysis of attributes from the feedforward network 430. As described herein, the feedforward network 430 stores attributes corresponding to past financial decisions.

In a Q-learning context, a financial education lesson in a program results in the user 420's action, which is either a penalty or reward, that is fed back into the policy model. The robot 410 as a unit represents a configuration of sub-units operative to effectively communicate the financial education lesson to a user (e.g., a child) and then, evaluate the user's behavior. In one embodiment, the robot 410 as a unit includes a policy generator (e.g., the generator component 122-2 of FIG. 1), an adversarial discriminator (e.g., the discriminator component 122-3 of FIG. 1), and a feedforward component (e.g., the feedforward component 122-1 of FIG. 1). The adversarial discriminator is to use the optimizer model to compare the child's resulting financial state to the optimal financial state to evaluate the child's current action (as reflected in a reward or penalty).

When the user 420's actions are fed back into the adversarial discriminator, the adversarial discriminator will evaluate how the child's post financial education lesson debt-to-token ratio (i.e., debt:token) compares to the optimal debt-to-token ratio after an optimal financial education lesson at some state (t). The adversarial discriminator will output any difference value as a loss or a gain to the policy generator for further processing. The policy generator is to process this difference value and, in combination with information associated with the user 420's past decisions in previous financial education lessons, to generate an optimal policy that reduces the user's debt-to-token in the future. The feedforward component uses this optimal policy to identify a financial education lesson to teach the user 420 and what type of rewards or penalties to grant the child. Over a number of timesteps, as the robot 410 and the user 420 engage in additional financial education lessons, the policy generator updates the optimal policy to determine from which configuration of financial education lessons to select a lesson to teach.

In a modified Q-learning approach, the current policy may be characterized by the following parameters in the equation provided below: A state ("s") representing the user's debt-to-token ratio along with discriminator difference value; an action ("a") representing the user's previous or current purchase with the robot 410; an annealing factor ("γ") to attenuate past purchase impact; the reward ('r') from a user's action; and a timestep/iteration ("t") of a purchase.

$$Q(s_t, a_t) \leftarrow (1-\alpha) \cdot \underbrace{Q(s_t, a_t)}_{\text{old value}} +$$

$$\underbrace{\alpha}_{\text{learning rate}} \cdot \overbrace{\left( \underbrace{r_t}_{\text{reward}} + \underbrace{\gamma}_{\text{discount factor}} \cdot \underbrace{\max_a Q(s_{t+1}, a)}_{\text{estimate of optimal future value}} \right)}^{\text{learned value}}$$

After determining an optimal Q action for a particular timestep, the policy generator passes the optimal Q action to the feedforward component in order to create a probability distribution over all possible lessons it could teach the user 420 at the next timestep t+1. The equation below formulates the probability that a lesson, l, given the robot 410's action from a previous timestep (Q state), from some set of L lessons is chosen at a time t. The robot 410 executes a softmax function over all possible lessons to select a lesson, $l_{t+1}$ for the next timestep:

$$p(y = l \mid Q(s_t, a_t)) = \frac{\exp(w^j)^t Q(s_t, a_t) + b^j}{\sum_j \exp((w^j)^T Q(s_t, a_t) + b^j)} =$$

$$softmax(l) = \max\left( \frac{\exp(l_1)}{\sum_j \exp(l_j)}, \frac{\exp(l_2)}{\sum_j \exp(l_j)}, \ldots, \frac{\exp(l_n)}{\sum_j \exp(l_j)} \right) = l_{t+1}$$

The max function provided above includes a vector which is an array of probabilities where each probability represents a likelihood that the lesson, l, at that index is most appropriate for the user 420 at some timestep t. As previously mentioned, robot 410 will teach the user 420 a lesson $l_{t+1}$ for the next timestep and the loop continues for infinity. Please note that the reward (r) in the Q-learning context refers to the reward given to the robot 410 for teaching the user 420 and is different from any gain or loss in in tokens. In other words, a wise purchase may deplete the user 420's tokens but nevertheless may result in a positive reward (r) for bringing the user 420's financial state closer to the optimal financial state. The reward (r) may be negative if the user 420 makes a poor or incorrect financial decision. The reward (r) for the modified Q-learning approach as described herein may be provided by the adversarial discriminator or another component of the robot 410.

FIG. 5 illustrates a user interface 500 for an application in the system of FIG. 1. As shown in FIG. 5, the user interface 500 may be a Graphical User Interface (GUI) with various GUI elements. The user interface 500 may depict a framed Hypertext Markup Language (HTML) document with content (e.g., Rich Internet Content (RIC)) in at least one frame (e.g., an HTML inline frame (iframe) element).

The content in the user interface 500 generally displays various information regarding techniques for bi-modal learning in a financial context. As an example, the user interface 500 may display information depicting a financial education lesson of the learning process 400 of FIG. 4, including status information regarding a current financial state. Presenting and administrating the financial education lesson, as explained herein, requires execution of a program 510. A debt-to-token ratio 520 and a token count 530 represent the current financial state of the user as the program 510 is running. When the program 510 stops running, the user must enter an answer to a question (i.e., a financial decision) resulting in either a credit or a debit of tokens from the token count 530 and consequently, an adjustment to the debt-to-token ratio 520.

By way of example, FIG. 5 depicts a financial education lesson directed towards teaching a successful borrowing strategy to a child. This lesson may be part of a larger framework of lessons to inform the child about loans in general. A current policy (e.g., the policy model 260 of FIG. 2) for the child, as described herein, includes information (e.g., attributes) describing the child's financial acumen/state of mind and may indicate a penchant for toy cars, such as toy race cars, over other recreational items. As described herein, the child's financial acumen/state of mind may indicate the child's desires. In light of this current policy, the child is more likely to desire and (perhaps) ultimately purchase a toy race car over other recreational items including other toy cars. Not only will the lesson featuring the toy race car better interact with the child, the child's desire for the toy race car will be used to measure the lesson's effectiveness. If the child makes a good or correct financial decision while the policy indicates a desire for toy race cars and past behavior indicates bad prior financial decisions, the system 100 achieves the goal/reward of a better financial state for the child and the child also achieves their goal of the toy race car.

The system 100 identifies a group of lessons and selects from the group of lessons this financial education lesson based upon the child's past behavior (e.g., the behavior model 270 of FIG. 2). The system 100 may identify lessons specific to toy race cars, lessons that are agnostic with respect to the item being sold, and/or both. For instance, the system 100 may identify a lesson featuring toy race cars with additional content specific to toy race car or, alternatively, the system 100 may identify a lesson where any item may be used to illustrate the lessons' teachings.

The group of lessons can be distinguished from other lessons by matching the current policy and being likely to improve upon the child's financial state. The financial education lesson is selected for execution for having a highest expected reward (or a lowest expected penalty) amongst the group of lessons. It is important to note that by reward/penalty, the present disclosure may refer to an intrinsic value representing how much closer/further the child's financial decision(s) brings the child towards exhibiting optimal financial behavior. In some embodiments, the selectable option having the highest expected reward is the one decreasing the token count 530 the least and/or increasing the debt-to-token ratio 520 the least.

Visually, the financial decision of the program 510 appears as a set of options forming part of the financial education lesson. Each option refers to a different manner for obtaining the toy race car and results in a change to the debt-to-token ratio 520 and/or the token count 530 (i.e., a particular reward/penalty). The system 100 configures an option's particular reward/penalty based upon the current policy (e.g., the child's financial acumen). There are different consequences for selecting one option over another; as an example, an option having a longer loan term may have a lower interest rate than an option having a shorter loan term but will result in a larger overall financial cost. On the other hand, selecting the option having the shorter term will result in a substantial loan payment per month. One option may be to refrain from purchasing the toy race car while another option may be to purchase the toy race car without taking out a loan.

Once the child submits an answer to the financial decision, the child may or may not obtain a toy race car via the system 100 or as may be facilitated by the system 100 (e.g. via interaction with one or more product purchasing systems). Regardless of whether a toy race car is produced, the system 100 provides additional content to further inform the financial education lesson regarding proper borrowing/spending behavior. In some embodiments, the system 100 generates video/audio data (e.g., an animation) explaining each option in the financial decision as well personal/commercial debt in general.

As illustrated in FIG. 5, the program 510 provides five (5) options for the above-mentioned financial decision. In some embodiments, the system 100 implements an adversarial discriminator with a neural network (e.g., the optimizer model 280 of FIG. 2) for determining an optimal financial state for the child given at least the child's age. The child's current policy may also influence the optimal financial state such that the fulfillment of the child's desires is part of the adversarial discriminator's rubric; as an example, the optimal financial state for someone who loves toy race cars will be different from someone who does not or who loves video games instead of physical toys. The adversarial discriminator may initialize the neural network with indicia regarding the child's sources of tokens and future token count.

Depending upon what the optimal financial state would be for the child, the system 100 determines which of the illustrated five (5) options is the correct choice for the child's financial decision regarding the toy race car. The adversarial discriminator of the system 100 assigns values to each option based upon the child's current policy and past behavior. It may be optimal to pay for the toy race car without taking a loan since the token count 530 is sufficient. Pursing that option, however, may not be prudent given that the token count 530 would be completely depleted. It may be optimal under the circumstance to skip the toy race car and wait for a better financial state. Because the current policy indicates a penchant for toy race cars, the system 100 assigns a low value to the option, Option B, for not buying the toy race car. The system 100 uses a weight for buying the toy race car that is higher than weights used for other recreational items. In some instances where the child has a strong penchant for toy race cars, the system 100 may assign an infinitesimal weight to the option, Option B, for not buying the toy race car. Option C and Option D suggest debt obligations with different terms. The adversarial discriminator of the system 100 may assign values to each loan option based on which loan terms are more favorable given the child's policy and/or past behavior. For example, if the child's policy indicates an incoming gift next month of more than 100 tokens (which may be configured by a parent, for example, and may or may not be representative of or relate to some real-world value that may or may not be used to effect a real-world result), the child can repay the loan of Option D while incurring only 1 token of interest; the adversarial discriminator of the system 100 determines that Option D is the better choice over Option C. On the other hand, the best choice may be Option E to buy the toy race car by paying 50 tokens and taking a loan out for the other 50 tokens at 10% for one (1) year. Depending upon the child, any choices in the program 510 can be an optimal or near-optimal selection.

FIG. 6 illustrates one embodiment of a logic flow 600. The logic flow 600 may be representative of some or all of the operations executed by one or more embodiments described herein.

In the illustrated embodiment shown in FIG. 6, the logic flow 600 processes a policy model corresponding to a plurality of programs at block 602. For example, the logic flow 600 may process the policy model 260 of FIG. 2 which is associated with the generator component 122-2 of FIG. 1. Each program refers to a financial education lesson, and the policy model, in general, indicates a reward for completing that financial education lesson and a penalty if that lesson has not been completed successfully.

The logic flow 600 may identify, from the policy model, a program to run based upon a behavior model at block 604. The logic flow 600 may examine attributes corresponding to each program and determine whether that program's financial education lesson is to be presented to the user. For example, some of the attributes associated with the financial education lesson may include a reward attribute, the penalty attribute, and an ideal age or age range attribute. The logic flow 600 may access the user's current financial state (e.g., the current financial state 250 of FIG. 2) and compare that data to the attributes associated with the financial education lesson. The current financial state may show that the user in debt and with very few tokens at their disposal and the comparison may indicate that the reward attribute will bring the user out of debt. To illustrate by way of example, the user may owe five hundred (500) tokens and the reward attribute for completing the financial education lesson may be exactly five hundred (500) tokens. The logic flow 600 may identify the above-mentioned financial education lesson as the program to run.

In an alternative embodiment, the logic flow 600 may determine that the penalty attribute for unsuccessfully completing the above-mentioned financial education lesson also is five hundred (500) tokens. Thus, the user's current financial status will fall to one thousand (1000) tokens if the user is unsuccessful. The policy model may include importance weight values for various attributes (e.g., video gaming, outdoor activities, and/or the like) and a weighted analysis of these attributes may predict the user's response to the above-mentioned financial education lesson. To illustrate by way of example, if the user enjoys video gaming and has a very high weight assigned to video gaming, that user may not be successful at the above-mentioned financial education. If the difficulty of the above-mentioned financial education lesson mandates a maximum weight for video gaming and the user's weight exceeds that maximum, the user is likely to fail the above-mentioned financial education lesson and another lesson should be selected. The present disclosure envisions other methods for applying the weighted analysis of the user's attributes (including the video gaming attribute) to a financial education lesson to predict the user's response to that lesson.

The logic flow 600 may proceed in examining programs to possibly run. The logic flow 600 may identify a second financial education lesson in accordance with the policy model. The second financial education lesson may have a difficulty appropriate to the user's age and financial acumen in addition to having a reward attribute of 500 tokens and a penalty attribute of three (3) tokens. Even if the user is unsuccessful at completing the second financial education lesson, the penalty attribute, being only 3 tokens, is a trivial amount when compared to the reward attribute. Even if a probability of being unsuccessful is greater than a probability of being successful, the penalty attribute of only 3 tokens is still a trivial amount.

When examining the second financial education lesson as a potential program, the logic flow 600 may examine a behavior model (e.g., the behavior model 270 of FIG. 2) for information on the user's past decisions. Some of these past decisions may be related to decisions in programs running financial education lessons but other past decisions may be financial decisions for money instead of tokens (e.g., commercial purchases). One past decision may be for the second financial education lesson or a similar financial education lesson. If the user's past decisions indicate a high probability or likelihood that the user will complete the second financial education lesson, the logic flow 600 may select the second financial education lesson as the program to run.

On the other hand, the logic flow 600 may determine that the user's past decisions indicate the user will be unsuccessful. On top of losing three (3) tokens, it is likely that the user will not gain any financial acumen from this financial education lesson. For this reason, the logic flow 600 proceeds in the examination of financial education lessons for a program to run. The logic flow 600 may identify a third financial education lesson in accordance with the policy model. The third financial education lesson may satisfy the policy model and the behavior model; for example, the weighted analysis of the third financial education lesson's attributes may produce a weighted value that falls a defined threshold value.

The logic flow 600 may examine other financial education lessons and based upon that examination, may or may not identify one or more financial lessons to consider for running and/or suggest to the user. In one alternative embodiment, the logic flow 600 may identify a set of financial education lessons based upon the policy model and narrow down that set to one financial education lesson based upon the behavior model.

In some embodiments, the logic flow 600 performs a weighted analysis that yields a prediction as to the user's future financial decisions with respect to money. The logic flow 600 may examine the behavior model and identify a current trend towards better or worse financial acumen. The logic flow 600 may identify another financial education lesson to account for the current trend. If the user's real-world finances are becoming worse and the user is exhibiting financially careless behavior, the logic flow 600 may select a financial education lesson directed towards handling this trend. Vice versa, if the user's finances are becoming better, the logic flow 600 may select a financial education lesson of higher difficulty than the third financial education lesson. It is appreciated that there are a number of applicable machine learning techniques that train a classifier for categorizing a person's finances for the policy model.

The logic flow 600 may run the program and process user response data at block 606. For example, the logic flow 600 may process the user response data 290 of FIG. 2. The logic flow 600 may generate GUI elements, text, and other data for presentation on a user interface (e.g., the user interface 500 of FIG. 5).

The logic flow 600 may modify the behavior model and update the current financial state at block 608. For example, the logic flow 600 may modify the behavior model 270 of FIG. 2 and update the current financial state 250 of FIG. 2 with the user response data 290 of FIG. 2. The logic flow 600 may insert information into the behavior model regarding the recently completed program and a program outcome indicating a reward or a penalty. The logic flow 600 may compute a new debt-to-token based upon the program outcome. Given the program outcome, the logic flow 600 may increase or decrease a debt-to-token ratio given the program outcome reward or penalty. In some instances, the user may borrow tokens to complete the program and a loss increases a debt in the debt-to-income ratio. In other instance, the user may lose or gain tokens as an outcome resulting in a change in the debt-to-income ratio.

The logic flow 600 may compare the updated financial state with an optimal financial state to produce a comparison result at block 610. For example, the logic flow 600 may compare the updated current financial state 250 of FIG. 2 with the optimal financial state data to produce the comparison result. Another model (e.g., a neural network, such as the optimizer model 280 of FIG. 2) may be employed to provide the optimal financial state data for the user based upon user age and/or user financial acumen. The comparison result may include a difference between the updated financial state and the optimal financial state. The difference may be a difference between the user's updated debt-to-token ratio and an optimal debt-to-token ratio.

The logic flow 600 may modify a policy model based upon the comparison result at block 612. The logic flow 600 may update a neural network for the policy model to account for the comparison result according to one embodiment. A decrease in the debt-to-token ratio (e.g., resulting from a reward) indicates better financial acumen for the user. For example, the logic flow 600 may adjust attributes of the policy model to indicate a higher financial acumen for the user such that programs configured for the higher financial acumen become available. The embodiments are not limited to this example.

FIG. 7 illustrates one embodiment of a logic flow 700. The logic flow 700 may be representative of some or all of the operations executed by one or more embodiments described herein.

In the illustrated embodiment shown in FIG. 7, the logic flow 700 may select a program configured to decrease a current debt-to-token ratio at block 702. For example, the logic flow 700 may identify the program appropriate for the user's age and financial acumen level based upon a policy model as described herein. The logic flow 700 may predict that running the identified program results in a reward of tokens which will reduce debt or increase a token account.

The logic flow 700 may compute an expected reward/penalty and expected debt-to-token ratio based upon past decisions at block 704. For example, the logic flow 700 may compute a probability of completing the program and achieving a reward based upon the user's past decisions with respect to other programs. The logic flow 700 may compute a probability close to or at one hundred percent if the user completed a program of same or higher difficulty. Using this probability, the logic flow 700 may compute the expected reward and the expected debt-to-token ratio including the expected reward. The logic flow 700 may run the program if the expected debt-to-token ratio is the best or highest among the choices of programs.

The logic flow 700 may process a user response including an answer to a financial decision in the program at block 706. The user response is to result in an actual reward/penalty. For example, the logic flow 700 may credit tokens to reward a correct answer and debit tokens to penalize an incorrect answer. As another example, the logic flow 700 may unlock features/components of the program to reward a correct answer and lock those features/components to penalize an incorrect answer. The logic flow 700 may add the user response to a behavior model storing the past user decisions and update the debt-to-token ratio and the token account.

The logic flow 700 may compare an optimal debt-to-token ratio with the expected debt-to-token ratio and/or the actual debt-to-token ratio at block 708. Any of these comparison(s) may provide a difference between ratio values, which in turn provides information on the user's financial acumen. The difference also is used to update the policy model to increase the user's financial acumen to meet the optimal debt-to-token ratio. The embodiments are not limited to this example.

Figure 8:
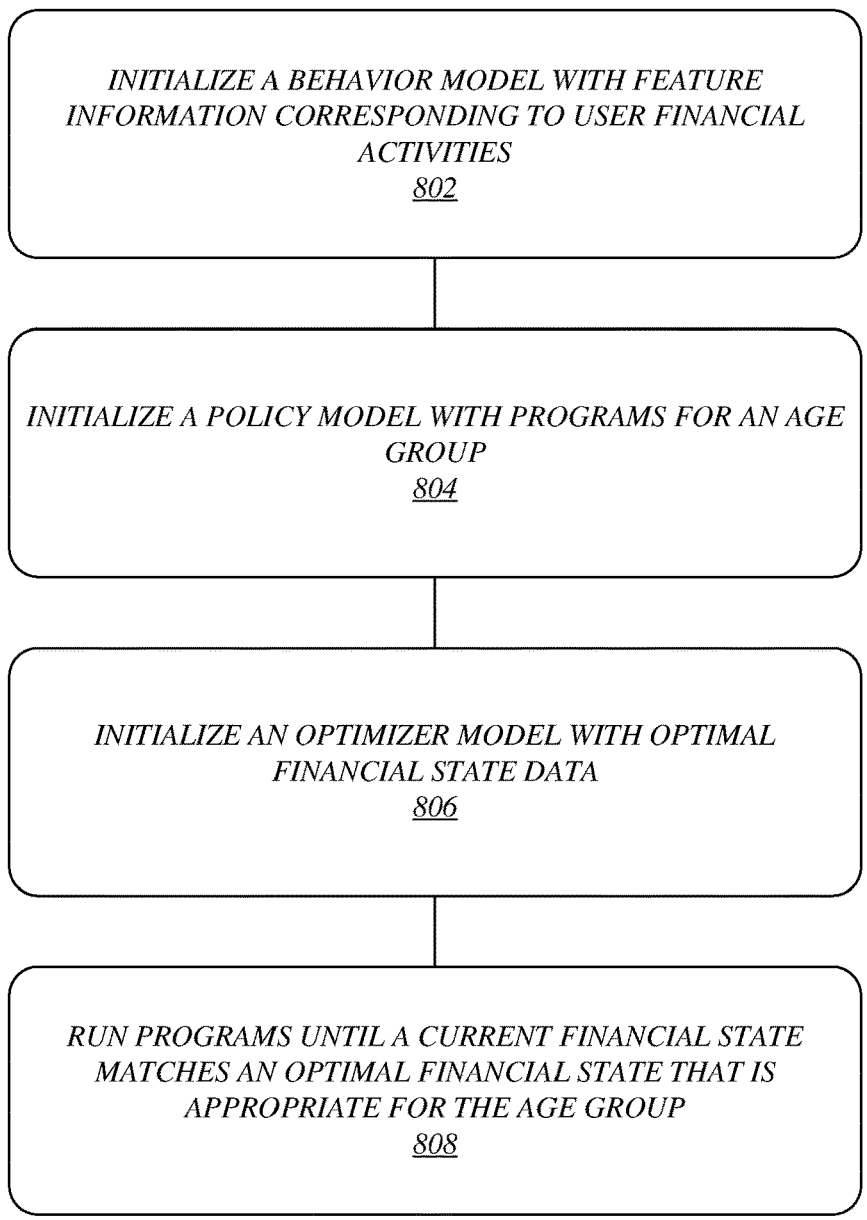
FIG. 8 illustrates an embodiment of a third logic flow for the system of FIG. 1.

FIG. 8 illustrates one embodiment of a logic flow 800. The logic flow 800 may be representative of some or all of the operations executed by one or more embodiments described herein.

In some embodiments, the logic flow 800 initializes an interface component with customer service calls. The customer service calls have user descriptions of financial issues and concepts and provide a basis for communicating with the user. For example, the interface component may be the user interface component 122-4 and the logic flow 800 may use natural language processing (NLP) techniques to categorize the user descriptions. With enough user descriptions, the logic flow 800 uses these techniques to generate text that is comprehensible to others.

In the illustrated embodiment shown in FIG. 8, the logic flow 800 initializes a behavior model with feature information corresponding to user financial activities at block 802. In general, the feature information includes attributes describing the user's responses to past decisions (e.g., financial decisions presented in a financial education lesson). These responses are used to compute an expected reward or expected penalty for pending financial education lesson.

The user financial activities include user financial decisions with money, such as purchases of goods and services, as well as with tokens in use with an apparatus running the application 120 of FIG. 1. These financial decisions may indicate the user's proclivities with respect to certain recreational activities, especially expensive ones. For example, the feature information may include attributes for video gaming, sports entertainment, outdoor activities, and/or the like. If the user is a prolific video gamer whose video game related purchases exceed a certain percentage of the user's income, the logic flow 800 assigns an appropriate value to the corresponding video gaming attribute. In general, that user's attribute value will be considerably higher than another user whose video gaming can be classified as casual. Depending on a weight value assigned to the video gaming attribute in a weighted analysis of the behavior model, the logic flow 800 may predict the user to lose tokens after a program and the other user to gain tokens after the same program.

The user financial activities may also indicate user decisions with respect to one or more of the programs having financial education lessons. The feature information includes attributes identifying a particular program and its associated reward/penalty outcome. The logic flow 800 may perform a weighted analysis on the behavior model to establish a baseline financial acumen. The logic flow 800 may further use the behavior model to predict whether the user successfully completes a financial education lesson.

The logic flow 800 may initialize a policy model with a set of programs for an age group at block 804. For example, the logic flow 800 may initialize the policy model 260 with programs configured for the user's age and establish attributes for those programs, including a difficulty, a reward, and a penalty. The logic flow 800 may further initialize the policy model with the feature information depicting the user's interests, the user's short-term desires/long-term desires, financial income, and/or the like. Some of the embodiments described herein involve a robot helping a child gain financial literacy. Example feature information for the child may include the child's age as an age attribute, a new toy as a short-term desire attribute, a college education or a car as a long-term desire attribute, and familial income as a financial income attribute.

The logic flow 800 may initialize an optimizer model with optimal financial state data at block 806. For example, the logic flow 800 may store the optimal financial state data in a form of an optimal debt-to-token ratio for the age group of the user as well as optimal debt-to-token ratios for other age groups. The other debt-to-token ratios may be used to update an application (e.g., the application 120 of FIG. 1) running the logic flow 800 such that an appropriate optimal debt-to-token is used to compute differences with the user's current financial state. A portion of these difference values provide an indication of the user's financial acumen. Over time, the difference values show the user's progress in their financial acuity.

The logic flow 800 may run programs until a current financial state matches an optimal financial state that is appropriate for the age group of the user at block 808. The logic flow 800 may run the programs in an apparatus (e.g., the apparatus 200 of FIG. 2), specifically an electronic device having computer hardware and software components. For example, the logic flow 800 may continuously execute processor instructions or logic (e.g., the logic 240 of FIG. 2) while the user's current debt-to-token ratio is below the optimal debt-to-token ratio. When the user provides one or more current user responses and, in return, is credited with a sufficient number of tokens as rewards, the user's debt-to-token ratio may match the optimal debt-to-token ratio, ending the logic flow 800. Alternatively, the logic flow 800 may download additional programs to run including those for older users if the user is a child. In some instances, the logic flow 800 may update the policy model with programs for another age group, such as when the user grows older. The embodiments are not limited to this example.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 9:
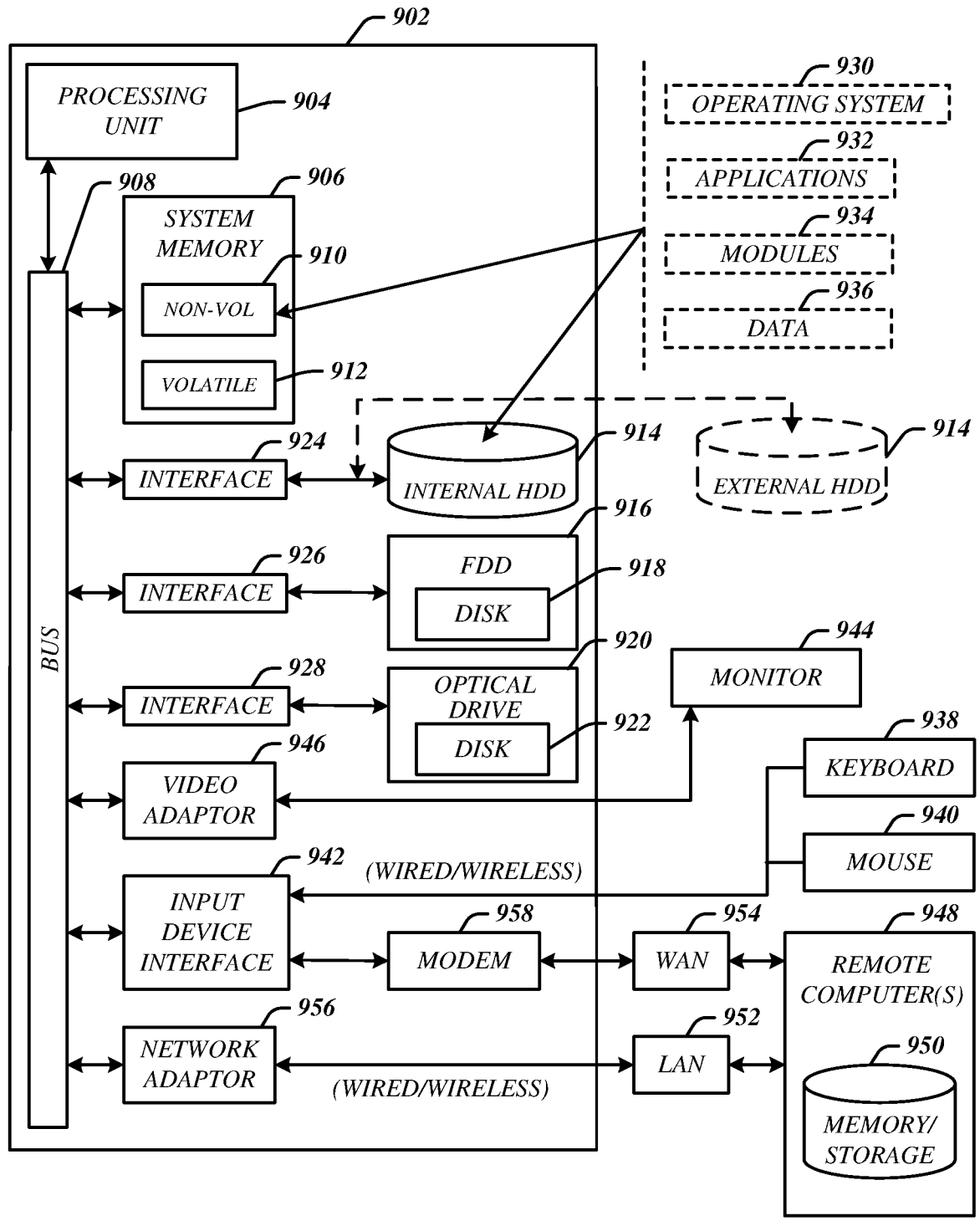
FIG. 9 illustrates an embodiment of a computing architecture.

FIG. 9 illustrates an embodiment of an exemplary computing architecture 900 suitable for implementing various embodiments as previously described. In one embodiment, the computing architecture 900 may comprise or be implemented as part of an electronic device. Examples of an electronic device may include those described with reference to FIG. 8, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 900. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 900 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 900.

As shown in FIG. 9, the computing architecture 900 comprises a processing unit 904, a system memory 906 and a system bus 908. The processing unit 904 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 904.

The system bus 908 provides an interface for system components including, but not limited to, the system memory 906 to the processing unit 904. The system bus 908 can be any of several types of bus structure that may further interconnect to a memory bus (with or without a memory controller), a peripheral bus, and a local bus using any of a variety of commercially available bus architectures. Interface adapters may connect to the system bus 908 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 900 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 906 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 9, the system memory 906 can include non-volatile memory 910 and/or volatile memory 912. A basic input/output system (BIOS) can be stored in the non-volatile memory 910.

The computer 902 may include various types of computer-readable storage media in the form of one or more lower speed memory units, including an internal (or external) hard disk drive (HDD) 914, a magnetic floppy disk drive (FDD) 916 to read from or write to a removable magnetic disk 918, and an optical disk drive 920 to read from or write to a removable optical disk 922 (e.g., a CD-ROM or DVD). The HDD 914, FDD 916 and optical disk drive 920 can be connected to the system bus 908 by a HDD interface 924, an FDD interface 926 and an optical drive interface 928, respectively. The HDD interface 924 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 910, 912, including an operating system 930, one or more application programs 932, other program modules 934, and program data 936. In one embodiment, the one or more application programs 932, other program modules 934, and program data 936 can include, for example, the various applications and/or components of the system 100.

A user can enter commands and information into the computer 902 through one or more wire/wireless input devices, for example, a keyboard 938 and a pointing device, such as a mouse 940. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 904 through an input device interface 942 that is coupled to the system bus 908, but can be connected by other interfaces such as a parallel port, IEEE 1394 serial port, a game port, a USB port, an IR interface, and so forth.

A monitor 944 or other type of display device is also connected to the system bus 908 via an interface, such as a video adaptor 946. The monitor 944 may be internal or external to the computer 902. In addition to the monitor 944, a computer typically includes other peripheral output devices, such as speakers, printers, and so forth.

The computer 902 may operate in a networked environment using logical connections via wire and/or wireless communications to one or more remote computers, such as a remote computer 948. The remote computer 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wire/wireless connectivity to a local area network (LAN) 952 and/or larger networks, for example, a wide area network (WAN) 954. Such LAN and WAN networking environments are commonplace in offices and companies, and facilitate enterprise-wide computer networks, such as intranets, all of which may connect to a global communications network, for example, the Internet.

When used in a LAN networking environment, the computer 902 is connected to the LAN 952 through a wire and/or wireless communication network interface or adaptor 956. The adaptor 956 can facilitate wire and/or wireless communications to the LAN 952, which may also include a wireless access point disposed thereon for communicating with the wireless functionality of the adaptor 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wire and/or wireless device, connects to the system bus 908 via the input device interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 10:
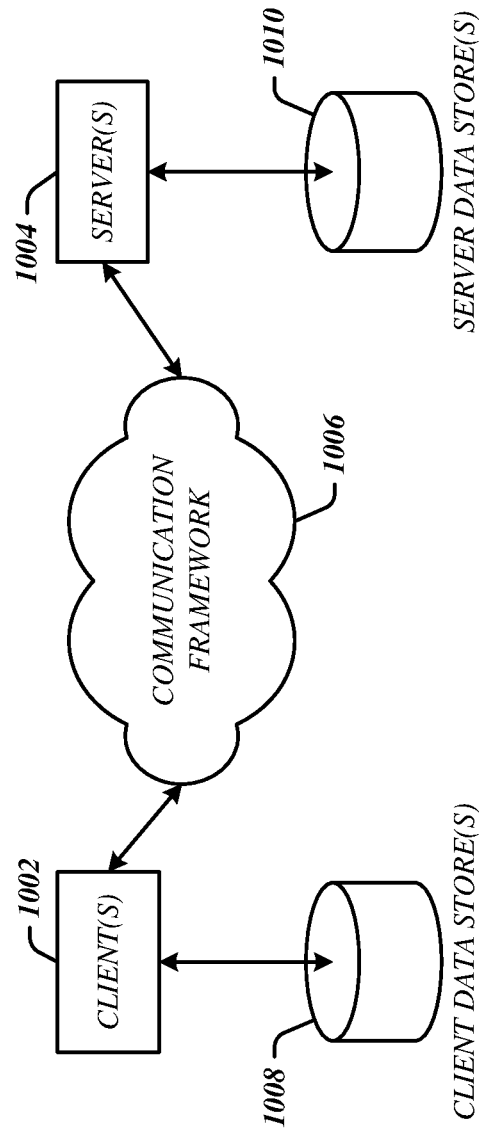
FIG. 10 illustrates an embodiment of a communications architecture.

FIG. 10 illustrates a block diagram of an exemplary communications architecture 1000 suitable for implementing various embodiments as previously described. The communications architecture 1000 includes various common communications elements, such as a transmitter, receiver, transceiver, radio, network interface, baseband processor, antenna, amplifiers, filters, power supplies, and so forth. The embodiments, however, are not limited to implementation by the communications architecture 1000.

As shown in FIG. 10, the communications architecture 1000 comprises includes one or more clients 1002 and servers 1004. The clients 1002 may implement the client device 310. The servers 1004 may implement the server device 950. The clients 1002 and the servers 1004 are operatively connected to one or more respective client data stores 1008 and server data stores 1010 that can be employed to store information local to the respective clients 1002 and servers 1004, such as cookies and/or associated contextual information.

The clients 1002 and the servers 1004 may communicate information between each other using a communication framework 1006. The communications framework 1006 may implement any well-known communications techniques and protocols. The communications framework 1006 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1006 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1002 and the servers 1004. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. An apparatus, comprising:
   a processing circuit; and
   logic stored in computer memory and executed on the processing circuit, the logic operative to cause the processing circuit to:
   initiate, by a generative adversarial network (GAN), a program from a plurality of programs, wherein each program corresponds to a reward or a penalty to a current financial state;
   compute, by the GAN, an expected financial state for a user based upon a probability of obtaining an award associated with a financial decision of the program, the probability based upon past decisions made by the user;
   process, by the GAN, a user response including an answer to a financial decision of the program to determine an actual financial state of the user;
   update a feedforward component, a generator component of the GAN, and a discriminator component of the GAN based on the answer to the financial decision and the actual financial state,
   wherein the feedforward component comprises a neural network behavior model incorporating past decisions by the user with respect to the plurality of programs, wherein the feedforward component utilizes a modified Q-learning approach to determine an optimal Q action for a particular timestep of a past decision by the user to create a probability distribution over all possible financial lessons to teach the user, wherein the feedforward component utilizes the modified Q-learning approach to select a financial lesson to teach the user to improve the user's actual financial state based on a probability the user will complete the financial lesson, the probability based upon past decisions of the user of past lessons received by the GAN, wherein the feedforward component determines the probability the user will complete the financial lesson using the probability distribution, wherein the probability distribution is formed by a probability determined by the generator component of features of lessons based on labels of the lessons and by a probability determined by a discriminator component of labels of the lessons based on features of the lessons, wherein the processing circuit is further to provide the selected financial lesson to the user; and
   transmit, by the GAN, to a user interface in data communication with the GAN, content associated with the selected financial lesson to display the content on the user interface.

2. The apparatus of claim 1, the processing circuit to:
   communicate, to a server, the financial lesson, the server to generate an update to the program based on the financial lesson;
   receive, from the server, the update to the program, the update including instructions generated based on the financial lesson, which when executed by the processing circuit, configures the apparatus for running the financial lesson to teach to the user to improve the user's actual financial state;
   compare, by the GAN, the actual financial state with the expected financial state and an optimal financial state, the optimal financial state determined by the discriminator component of the GAN; and
   update, by the GAN, the generator component of the GAN based on the comparison.

3. The apparatus of claim 2, wherein the optimal financial state is based upon an age of the user, a financial acumen of the user, or a combination thereof, and
   wherein the processing circuit is further to process user responses, determine actual financial state of the user, and update the feedforward component and the generator component repeatedly until the current financial state meets or exceeds the optimal financial state.

4. The apparatus of claim 1, the logic further operative to cause the generator component of the GAN to configure the plurality of programs to improve upon the current financial state.

5. The apparatus of claim 4, wherein the current financial state comprises a debt-to-token ratio, and an improvement upon the current financial state is a decrease in the debt-to-token ratio.

6. The apparatus of claim 2, the processing circuit to select, via the feedforward component, a different program from the plurality of programs having a highest expected reward based on the comparison and the expected financial state not achieving the optimal financial state, and the highest expected reward computed based on past decisions with the program for the user.

7. The apparatus of claim 1, the processing circuit to identify, via the feedforward component, the plurality of programs based upon a label classification of financial activities and past financial decisions of the user, wherein the label classification is a determined financial acumen for the user.

8. The apparatus of claim 7, the processing circuit to select, via the feedforward component, the program from the plurality of programs having a highest expected reward, and the highest expected reward computed based on past decisions with the program for the user.

9. The apparatus of claim 8, the processing circuit to compute, via the feedforward component, the expected financial state, and the expected financial state comprising an expected reward or an expected penalty and an expected debt-to-token ratio based upon the past decisions by the user.

10. A computer-implemented method, comprising:
   selecting, by a generative adversarial network (GAN), a program from a plurality of programs, wherein each program corresponds to a reward or a penalty to a current financial state;
   computing, by the GAN, an expected financial state for a user based upon decisions made by the user;
   executing, by the GAN, the program including a financial question;
   receiving, by the GAN, a user response including an answer to the financial question of the program to determine an actual financial state;
   updating a feedforward component, a generator component of the GAN, and a discriminator component of the GAN based on the answer to the financial question and the actual financial state,
   wherein the feedforward component comprises a neural network behavior model incorporating past decisions by the user with respect to the plurality of programs, wherein the feedforward component utilizes a modified Q-learning approach to determine an optimal Q action for a particular timestep of a past decision by the user to create a probability distribution over all possible financial lessons to teach the user, wherein the feedforward component utilizes the modified Q-learning approach to select a financial lesson to teach the user to improve the user's actual financial state based on a probability the user will complete the financial lesson, the probability based upon past decisions of the user of past lessons received by the GAN, wherein the feedforward component determines the probability the user will complete the financial lesson using the probability distribution, wherein the probability distribution is formed by a probability determined by the generator component of features of lessons based on labels of the lessons and by a probability determined by a discriminator component of labels of the lessons based on features of the lessons, wherein the processing circuit is further to provide the selected financial lesson to the user; and
   transmitting, by the GAN, to a user interface in data communication with the GAN, content associated with the selected financial lesson to display the content on the user interface.

11. The computer-implemented method of claim 10, comprising:
   communicating, to a server, the financial lesson, the server to generate an update to the program based on the financial lesson;
   receiving, from the server, the update to the program, the update including instructions generated based on the financial lesson, which when executed by the processing circuit, configures the apparatus for running the financial lesson to teach to the user to improve the user's actual financial state;
   comparing, by the GAN, the actual financial state with the expected financial state and an optimal financial state, the optimal financial state determined by the discriminator component of the GAN; and
   updating, by the GAN, the generator component of the GAN based on the comparison.

12. The computer-implemented method of claim 11, wherein the optimal financial state is based upon an age of the user, a financial acumen of the user, or a combination thereof, and
   wherein the GAN is further to execute the program and process user responses repeatedly until the current financial state meets or exceeds the optimal financial state.

13. The computer-implemented method of claim 10, wherein the GAN is further to cause the generator component of the GAN to configure the plurality of programs to improve upon the current financial state.

14. The computer-implemented method of claim 13, wherein the current financial state comprises a debt-to-token ratio, and an improvement upon the current financial state is a decrease in the debt-to-token ratio.

15. The computer-implemented method of claim 11, comprising selecting, via the feedforward component of the GAN, a different program from the plurality of programs having a highest expected reward based on the comparison and the expected financial state not achieving the optimal financial state, and the highest expected reward computed based on past decisions with the program for the user.

16. The computer-implemented method of claim 11, comprising identifying, via the feedforward component of the GAN, the plurality of programs based upon a label classification of financial activities and past financial decisions of the user, wherein the label classification is a determined financial acumen for the user.

17. The computer-implemented method of claim 16, comprising selecting, by the feedforward component of the GAN, the program from the plurality of programs having a highest expected reward, and the highest expected reward computed based on past decisions with the program for the user.

18. The computer-implemented method of claim 17, comprising computing, via the feedforward component of the GAN, the expected financial state, and the expected financial state comprising an expected reward or an expected penalty and an expected debt-to-token ratio based upon the past decisions by the user.

19. At least one non-transitory computer-readable storage medium comprising instructions that, when executed, cause a system to:
   determine, by a generative adversarial network (GAN), a program to present one or more financial questions, the program to issue rewards or penalties to a current financial state in response to user responses;
   compute, by the GAN, an expected financial state for a user based upon decisions made by the user;
   execute, by the GAN, the program including the financial question;
   process, by the GAN, a user response including an answer to the financial question to determine an actual financial state;
   update a feedforward component, a generator component of the GAN, and a discriminator component of the GAN based on the answer to the financial question and the actual financial state, wherein the feedforward component comprises a neural network behavior model incorporating past decisions by the user with respect to the plurality of programs, wherein the feedforward component utilizes a modified Q-learning approach to determine an optimal Q action for a particular timestep of a past decision by the user to create a probability distribution over all possible financial lessons to teach the user, wherein the feedforward component utilizes the modified Q-learning approach to select a financial lesson to teach the user to improve the user's actual financial state based on a probability the user will complete the financial lesson, the probability based upon past decisions of the user of past lessons received by the GAN, wherein the feedforward component determines the probability the user will complete the financial lesson using the probability distribution, wherein the probability distribution is formed by a probability determined by the generator component of features of lessons based on labels of the lessons and by a probability determined by a discriminator component of labels of the lessons based on features of the lessons, wherein the processing circuit is further to provide the selected financial lesson to the user; and transmit, by the GAN, to a user interface in data communication with the GAN, content associated with the selected financial lesson to display the content on the user interface.

20. The at least one non-transitory computer-readable storage medium of claim 19, comprising instructions that, when executed, cause the system to:

determine, via the GAN the program from a plurality of programs having a highest expected reward, and the highest expected reward computed based on past decisions with the program for the user;

communicate, to a server, the financial lesson, the server to generate an update to the program from the financial lesson; and receive, from the server, the update to the program, the update including instructions, generated based on the financial lesson, which when executed by the processing circuit, configures the apparatus for running the financial lesson to teach to the user to improve the user's actual financial state.

* * * * *